US007152697B2

(12) United States Patent
Horton et al.

(10) Patent No.: US 7,152,697 B2
(45) Date of Patent: Dec. 26, 2006

(54) DELAYED PHASE CHANGING AGENT FOR INVERT EMULSION DRILLING FLUID

(75) Inventors: Robert L. Horton, Sugar Land, TX (US); Bethicia Prasek, Houston, TX (US); Frank E. Evans, The Woodlands, TX (US); Taylor Green, Houston, TX (US); Mark Luyster, Houston, TX (US); Steve Mason, Katy, TX (US)

(73) Assignee: M-I LLC, Houston, TX (US)

( * ) Notice: Subject to any disclaimer, the term of this patent is extended or adjusted under 35 U.S.C. 154(b) by 52 days.

(21) Appl. No.: 10/772,550

(22) Filed: Feb. 3, 2004

(65) Prior Publication Data

US 2004/0176255 A1 Sep. 9, 2004

Related U.S. Application Data

(60) Provisional application No. 60/319,922, filed on Feb. 3, 2003.

(51) Int. Cl.
*E21B 21/00* (2006.01)
*E21B 37/00* (2006.01)
*C09K 7/02* (2006.01)

(52) U.S. Cl. .......... 175/64; 166/300; 166/312; 175/65; 507/114; 507/129; 507/131; 507/241; 507/929

(58) Field of Classification Search .......... 166/291, 166/300, 312; 175/64, 65, 72; 507/114, 507/129, 131, 133, 241, 929
See application file for complete search history.

(56) References Cited

U.S. PATENT DOCUMENTS

| 5,439,056 | A  | * | 8/1995  | Cowan ................ 166/293 |
| 6,218,342 | B1 |   | 4/2001  | Patel |
| 6,325,149 | B1 | * | 12/2001 | Dobson et al. .......... 166/305.1 |
| 6,631,764 | B1 | * | 10/2003 | Parlar et al. .............. 166/278 |
| 6,849,581 | B1 | * | 2/2005  | Thompson et al. ........ 507/118 |
| 6,989,354 | B1 | * | 1/2006  | Thaemlitz et al. ........ 507/131 |

| 2001/0051593 | A1 |   | 12/2001 | Patel |
| 2002/0033258 | A1 |   | 3/2002  | Patel |
| 2004/0147404 | A1 | * | 7/2004  | Thaemlitz et al. ........ 507/100 |

FOREIGN PATENT DOCUMENTS

| WO | 01/61148 A3 | 8/2001 |
| WO | 0161148 A2  | 8/2001 |

OTHER PUBLICATIONS

International Search Report—International Application No. PCT/US 2004/002969—International Filing Date Feb. 3, 2003—Applicant: M-I L.L.C.

* cited by examiner

*Primary Examiner*—George Suchfield
(74) *Attorney, Agent, or Firm*—Osha Liang LLP

(57) ABSTRACT

A method of controlling and delaying the inversion of a drilling fluid and the wettability of a filtercake by using a delayed phase changing agent. The filtercake is preferably formed while drilling a subterranean formation using a drilling fluid includes: an oleaginous fluid; a non-oleaginous fluid; an amine surfactant having the structure:

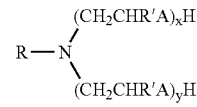

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$. In the method, the filter cake is exposed to a delayed phase changing agent selected from the group consisting of aliphatic amine acids, salts of aliphatic amine acids and combinations thereof. In one preferred illustrative embodiment, the delayed phase changing agent is delivered in the form of a pill, the pill including a carrier fluid, a viscosifier and the delayed phase changing agent. The delayed phase changing agent may be selected from ethylene diamine tetraacetic acid, alkali metal salts of ethylene diamine tetraacetic acid and combinations of these and similar compounds.

8 Claims, No Drawings

DELAYED PHASE CHANGING AGENT FOR INVERT EMULSION DRILLING FLUID

This application claims the benefit under 35 U.S.C. §119 (e) to U.S. Provisional patent application No. 60/319,922, filed Feb. 3, 2003, the contents of which are incorporated herein by reference, is claimed.

DESCRIPTION

Many types of fluids have been used in the drilling of oil and gas wells. The selection of an oil-based drilling fluid, also known as oil-based mud, involves a careful balance of the both the more and less desirable characteristics of such fluids in a particular application, the type of well to be drilled and the characteristics of the oil or gas field in which the well is to be drilled. A surfactant capable of emulsifying incorporated water into the oil is an essential component of oil-based muds.

The primary benefits of selecting an oil-based drilling fluid include: superior hole stability, especially in shale formations; formation of a thinner filter cake than that achieved with a water based mud; excellent lubrication of the drilling string and downhole tools; penetration of salt beds without sloughing or enlargement of the hole, as well as other benefits that should be known to one of skill in the art.

Especially beneficial properties of oil-based muds are their excellent rate-of-penetration and lubrication qualities. These two properties permit the rapid drilling of wells having a significant vertical deviation, as is typical of off-shore or deep water drilling operations or when a horizontal well is desired. In such highly deviated holes, torque and drag on the drill string are a significant problem because the drill pipe lies against the low side of the hole, and the risk of pipe sticking is high when water based muds are used. In contrast oil-based muds provide a thin, slick filter cake, which helps to deliver significantly higher horsepower to the rock face being drilled and to prevent pipe from sticking. Thus the use of the oil based mud can be justified.

Despite the many benefits of utilizing oil-based muds, they also have less desirable characteristics. In general the use of oil based drilling fluids and muds have high initial and operational costs. These costs can be significant depending on the depth of the hole to be drilled. However, often the higher costs can be justified if the oil based drilling fluid prevents the caving in or hole enlargement which can greatly increase drilling time and costs. Disposal of oil-coated cuttings is another primary concern, especially for off-shore or deep-water drilling operations. In these latter cases, the cuttings must be either washed clean of the oil with a cleaning solution which also must be disposed of, or the cuttings must be shipped back to shore for disposal in an environmentally safe manner. Another consideration that must be taken into account is the local governmental regulations that may restrict the use of oil based drilling fluids and muds for environmental reasons.

Oil-based muds contain some water, either formed in the formulation of the drilling fluid itself, or residual water in the hole, or intentionally added water to affect the properties of the drilling fluid or mud. In such water-in-oil type emulsions, also know as invert emulsions, a emulsifier is utilized that will stabilize the emulsion. In general, the invert emulsion may contain both water soluble and oil soluble emulsifying agents. Typical examples of such emulsifiers include polyvalent metal soaps, fatty acids and fatty acid soaps, and other similar suitable compounds that should be known to one of skill in the art. The use of traditional emulsifiers and surfactants in invert drilling fluid systems can complicate the clean up process in open hole completion operations. Fluids using traditional surfactant and emulsifier materials may require the use of solvents and other surfactant washes to penetrate the filter cake and reverse the wettability of the filter cake particles. That is to say the washing with detergents should convert the oil-wet solids of the filter cake into water-wet solids. Water-wet solids in the filter cake are necessary so that the subsequent acid wash can attack the particles of the mud cake and destroy or remove them prior to production. The productivity of a well is somewhat dependent on effectively and efficiently removing the filter cake while minimizing the potential of water blocking, plugging or otherwise damaging the natural flow channels of the formation. The problems of efficient well clean-up, stimulation, and completion are a significant issue in all wells, and especially in open-hole horizontal well completions.

The present disclosure is generally directed to a method of controlling the reversing of phases in invert emulsion fluids that are useful in the drilling, completing and working over of subterranean wells, preferably oil and gas wells. The generalized use of invert emulsion fluids in such applications should be known to one of skill in the art as is noted in the book COMPOSITION AND PROPERTIES OF DRILLING AND COMPLETION FLUIDS, 5th Edition, H. C. H. Darley and George R. Gray, Gulf Publishing Company, 1988, the contents of which are hereby incorporated herein by reference.

In one embodiment of the present disclosure, an invert emulsion fluid which includes an oleaginous fluid, a non-oleaginous fluid, and an amine surfactant is used to drill a subterranean well. The surfactant component of the drilling fluid is selected so that when a majority of the amine surfactant is in its unprotonated form, an invert emulsion may be formed in which the oleaginous liquid is the continuous phase and the non-oleaginous liquid is the discontinuous phase. That is to say, the unprotonated form of the amine surfactant is able to stabilize an invert emulsion. However upon protonation of a major portion of the amine surfactant, the oleaginous liquid becomes the discontinuous phase and the non-oleaginous liquid becomes the continuous phase. In other words, the invert emulsion is converted to a regular emulsion upon the protonation of the amine surfactant. A delayed phase changing agent is utilized and mixed with the drilling fluid so as to permit a measure of control over the timing and/or conditions under which the amine is protonated and thus when the fluid is converted from regular emulsion to invert emulsion.

Another embodiment of the present subject matter involves a method of cleaning up a wellbore drilled with the invert emulsion drilling fluid described above. The method of cleaning up the wellbore involves the spotting of a pill including a carrier fluid, a viscosifier and a delayed phase changing agent at a targeted portion of the wellbore to be cleaned. The delayed phase changing agent and the viscosity of the pill control the timing of the conversion from oil-wet to water-wet of any residual drilling fluid or filter cake present at the targeted portion of the wellbore. Once converted to being water wet, the residual drilling fluid and filter cake is easily washed out of the well bore.

The invert emulsions utilized in the practice of the present disclosure include those that have been previously described in U.S. Pat. No. 6,218,342 as well as published U.S. Patent Applications No. US2001-0051593A1 and US2002-0033258A1, the contents of each being incorporated herein by reference. As disclosed therein, the oleaginous fluid utilized for formulating the invert emulsions used in the practice of the present invention are liquids and more preferably a natural or synthetic oil and yet more preferably the oleaginous fluid selected from the group including diesel oil; mineral oil; a synthetic oil, such as polyolefins, polydiorganosiloxanes, siloxanes or organo-siloxanes; and mixtures thereof. The concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluids for use in the present invention is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid.

The selection of a suitable amine surfactant for formulating the drilling fluids useful in the present invention is accomplished by combining an amount of the unprotonated amine with portions of the oleaginous fluid and non-oleaginous fluid in a suitable container. The fluid is then vigorously agitated or sheared so as to intimately mix the two fluids. Upon stopping of the mixing, visual observation will determine if an emulsion has formed. An emulsion is considered stable if the oleaginous and the non-oleaginous fluids do not substantially separate after agitation. That is to say the emulsion will last for more than about 1 minute after the halting of the agitating or shearing motion that formed the emulsion. One test of whether or not an invert emulsion has formed is to take a small portion of the emulsion and place it in a container of the oleaginous fluid. If an invert emulsion is formed, the drop of emulsion will disperse in the oleaginous fluid. An alternative test is to measure the electrical stability of the resulting emulsion using an commonly available emulsion stability tester. Generally in such tests, the voltage applied across two electrodes is increased until the emulsion breaks and a surge of current flows between the two electrodes. The voltage required to break the emulsion is regarded in the art as a measure of the stability of the emulsion. Such tests of emulsion stability should be well known to one of skill in the art as is evidenced by described on page 166 of the book COMPOSITION AND PROPERTIES OF DRILLING AND COMPLETION FLUIDS, 5th Edition, H. C. H. Darley and George R. Gray, Gulf Publishing Company, 1988, the contents of which are hereby incorporated herein by reference.

In view of the above selection criteria, in one embodiment of the present invention, an invert emulsion fluid is formulated with an amine surfactant having the general formula

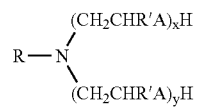

wherein R is $C_{12}$–$C_{22}$; R" is independently selected from hydrogen or $C_1$ to $C_3$ alkyl group; A is NH or O, and x+y has a value greater than or equal to one but also less than or equal to three. Preferably the R group may be a $C_{12}$–$C_{22}$ aliphatic hydrocarbon and more preferably is a non-cyclic aliphatic. In one embodiment the R group contains at least one degree of unsaturation that is to say at least one carbon-carbon double bond. In another embodiment the R group may be a commercially recognized mixture of aliphatic hydrocarbons such as soya, which is a mixture of $C_{14}$ to $C_{20}$ hydrocarbons, or tallow which is a mixture of $C_{16}$ to $C_{20}$ aliphatic hydrocarbons, or tall oil which is a mixture of $C_{14}$ to $C_{18}$ aliphatic hydrocarbons. In another embodiment, one in which the A group is NH, the value of x+y is preferably two with x having a preferred value of one. In yet another embodiment in which the A group is O, the preferred value of x+y is two with the value of x being preferably one. Preferred examples of commercially available amine surfactants include Ethomeen T/12 a diethoxylated tallow amine; Ethomeen S/12 a diethoxylated soya amine; Duomeen O a N-oleyl-1,3-diaminopropane, Duomeen T a N-tallow-1,3-diaminopropane, all of which are available from Akzo.

The amount of amine surfactant present in the invert emulsion fluid utilized in the practice of the present invention should be sufficient to stabilize the invert emulsion according to the above noted test. That is to say the emulsion will last for more than about 1 minute after the halting of the agitation or shearing motion that forms the emulsion. While the concentration may vary depending on the particular components in the drilling fluid or mud, typically the concentration is less than about 10% by volume of the fluid. Thus in one embodiment the amine surfactant is preferably present in the invert emulsion fluid at a concentration of 0.1% to 5.0%. More preferably the amount of amine surfactant present should be present in a concentration of 1 to 5% by volume of the fluid.

As previously noted above, an important property of the drilling fluids described above is that a protonating agent causes the conversion of the invert emulsion into a regular emulsion. That is to say the addition of a protonating agent causes a water-in-oil emulsion, converts into an oil-in-water type emulsion. The protonating agent, herein referred to as an "acid", must be functionally capable of protonating the amine surfactant. The role of the phase changing agent (i.e. an agent that results in the controlled protonation of the amine) is to delay and/or control the timing of the phase change in a predictable manner. By exerting such control, further options are presented for changing the wettability of any wellbore solids or the filter cake, to a higher degree of control by timing the change in wettability with a predictable delay.

The delayed phase changing agent of the present invention is designed such that the protonation of the amine compound, and hence the conversion of the fluid from invert to regular emulsion, is controlled and predictable based on the properties of the delayed phase changing agent. The mechanism by which the delayed phase changing agent works is not fully understood. It is believed that the delayed phase changing agent changes the wettability of the invert emulsion drilling fluids disclosed herein by action affecting the amine surfactant itself or indirectly by the impact of an acidifier or some other chemical present in the system. We have found that the delayed breaking agent can be selected from the general group of compounds including aliphatic amine acids, salts of aliphatic amine acids as well as mixtures and combinations of these compounds. In one illustrative embodiment, the delayed phase changing agent is a salt of ethylene diamine tetraacetic acid (EDTA). Preferably the salt is an alkali metal salt of EDTA, and more preferably a potassium salt of EDTA. In one particularly preferred illustrative embodiment, the dipotassium salt of EDTA is utilized as the delayed phase changing agent.

Also within the conception of the present subject matter is the use of a slowly hydrolysable chemical, such as an ester, which will cause the delayed protonation of the amine surfactant. Further one of skill in the art should appreciate that a combination of a chemical that will be degraded by an enzyme and the corresponding enzyme whose combination causes a controllable release of proton ion. One of skill in the art should appreciate that there may be numerous ways in which the above goals of controlling and delaying the change in phases described herein may be achieved. For example, encapsulated enzymes and other chemical breaker agents are well known in the fracturing fluid arts. In a similar manner, delayed phase changing agents such as those described above may be encapsulated to achieve the desired results of the present invention.

The method used in preparing the invert emulsion fluids utilized in the methods of the present disclosure is not critical. Conventional methods can be used to prepare the invert emulsion fluids in a manner analogous to those normally used, to prepare conventional oil-based drilling fluids. In one representative procedure, a desired quantity of oleaginous fluid such as a base oil and a suitable amount of amine emulsifier are mixed together and the remaining components are added sequentially with continuous mixing. An invert emulsion of the present invention is formed by vigorously agitating, mixing or shearing the oleaginous fluid and the non-oleaginous fluid.

The invert emulsion fluids of the present disclosure may further contain additional chemicals depending upon the end use of the invert emulsion so long as they do not interfere with the reversibility of the invert emulsion fluids described herein. For example, wetting agents, organophillic clays, viscosifiers, weighting agents, bridging agents and fluid loss control agents may be added to the fluid compositions of this invention for additional functional properties. The addition of such agents should be well known to one of skill in the art of formulating drilling fluids and muds. However, it should be noted that the addition of such agents should not adversely interfere with the properties imparted by the amine surfactant as described herein.

Wetting agents that may be suitable for use in this invention include, crude tall oil, oxidized crude tall oil, surfactants, organic phosphate esters, modified imidazolines and amidoamines, alkyl aromatic sulfates and sulfonates, and the like, and combinations or derivatives of these. However, the use of fatty acid wetting agents should be minimized so as to not adversely effect the reversibility of the invert emulsion disclosed herein. Versawet™ and Versawet™ NS are examples of commercially available wetting agents manufactured and distributed by M-I Drilling Fluids L.L.C. that may be used in this invention. Silwet L-77, L-7001, L7605 and L-7622 are examples of commercially available surfactants and wetting agents manufactured and distributed by Union Carbide Chemical Company Inc.

Organophilic clays, normally amine treated clays, may be useful as viscosifiers in the fluid compositions of the present invention. Other viscosifiers, such as oil soluble polymers, polyamide resins, polycarboxylic acids and soaps can also be used. The amount of viscosifier used in the composition can vary depending upon the end use of the composition. However, normally about 0.1% to 6% by weight range are sufficient for most applications. VG-69™ and VG-PLUS™ are organoclay materials distributed by M-I Drilling Fluids L.L.C., and Versa-HRP™ is a polyamide resin material manufactured and distributed by M-I Drilling Fluids L.L.C., that may be used in this invention.

Suspending agents suitable for use in this invention include organophillic clays, amine treated clays, oil soluble polymers, polyamide resins, polycarboxylic acids, and soaps. The amount of viscosifier used in the composition, if any, may vary depending upon the end use of the composition. However, normally about 0.1% to about 6% by weight is sufficient for most applications. VG-69™ and VG-PLUS™ are organoclay materials distributed by M-I Drilling Fluids L.L.C., and Versa-HRP™ is a polyamide resin material manufactured and distributed by M-I Drilling Fluids L.L.C., that may be used in this invention.

Weighting agents or density materials suitable for use in this invention include galena, hematite, magnetite, iron oxides, illmenite, barite, siderite, celestite, dolomite, calcite, and the like. The quantity of such material added, if any, depends upon the desired density of the final composition. Typically, weight material is added to result in a drilling fluid density of up to about 24 pounds per gallon. The weight material is preferably added up to 21 pounds per gallon and most preferably up to 19.5 pounds per gallon.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

Because many of properties of the invert emulsion of the present invention are similar to those of conventional invert emulsions, the application of the fluids should be straightforward.

One unexpected and unobvious aspect of drilling subterranean wells with the invert emulsion of the present invention is that well clean-up is much easier and quicker to carry out, especially when the well penetrates or comes into contact with a producing formation. As described above, when a conventional invert emulsion drilling fluid is used, cleaning up and stimulating the well may include washing the filter cake with detergents and an acid wash to dissolve the filter cake particles. If these operations are to be fully effective, a significant amount of aqueous detergent and aqueous acid may penetrate the formation resulting in water blockages in the formation which adversely affect production. In contrast, the drilling and completion of the well utilizing the fluids described herein and following the methods of the present invention allows the operator to penetrate the formation using an invert emulsion based fluids containing oil wet solids, and time the conversion of the oil wet solids into water wet solids in a controlled manner. By doing so, the use of a water based wash fluid is minimized because the filtercake and other solids will be easily washed away once they are water wet.

In carrying out the methods disclosed above, one of skill in the art should appreciate that a pill or slug of fluid can be used to deliver the delayed phase changing agent to a predetermined location within the wellbore. The formulation of such a pill or slug of fluid is designed such that the slug or pill remains generally uniform within the wellbore. In one embodiment the pill is formulated to include a carrier fluid, a viscosifying agent and a delayed phase changing agent. The carrier fluid may be selected from a wide range of potential fluids that should be apparent to one of skill in the art. Preferably the carrier fluid is an aqueous based fluid and more preferably is selected from the group including freshwater, sea water, brine, borehole wash fluids as well as combinations of these and other similar fluids. Similarly the viscosifying agent may be selected from a wide range of potential viscosifying agents that should be apparent to one of skill in the art. In one illustrative embodiment, the viscosifier is selected from the group including bentonite, sepiolite, clay, attapulgite clay, hydroxyethylcelluose, anionic high-molecular weight polymer and biopolymers as well as combinations of these and other similar viscosifying agents.

We have found that the delayed breaking agent can be selected from the general group of compounds including aliphatic amine acids, salts of aliphatic amine acids as well as mixtures and combinations of these compounds. In one illustrative embodiment, the delayed phase changing agent is a salt of ethylene diamine tetraacetic acid (EDTA). Preferably the salt is an alkali metal salt of EDTA, and more preferably a potassium salt of EDTA. In one particularly preferred illustrative embodiment, the dipotassium salt of EDTA is utilized as the delayed phase changing agent. The delayed phase changing agent preferably is formulated as a 15–40% wt % solution which is then utilized to formulate the final breaker solution.

The final breaker solution itself is preferably formulated to include an aqueous based solution of potassium chloride, a cationic surfactant and a viscosifying agent, such as hydroxyethylcellulose. Optionally defoamers, dispersants, and thermal stabilizers may be included so long as their function does not inhibit the ability of the delayed phase changing agent to function. One of skill in the art should appreciate that the inclusion of such optional agents or compounds assist in the overall performance of the final delayed breaker solution and will depend upon the specific application for the fluid. Thus routine trial and error testing will be needed to optimize the function of the delayed phase changing agent for any particular downhole environment.

The following example is provided to further illustrate the application and use of the methods and compositions of the present invention

EXAMPLE 1

A drilling fluid as described in U.S. Pat. No. 6,218,342 as well as published U.S. Patent Applications No. US2001-0051593A1 and US2002-0033258A1 was utilized for an open-hole gravel-pack for a well that was completed using a CAPS system. Limitations with the tool configuration for this completion necessitated testing of a breaker that would delay the reversal process. This delay would allow the washpipe to be pulled from the gravel-pack assembly without excessive and/or uncontrollable losses. The objective was to delay the reversal of a residual filter cake after incorporating the breaker in the Beta phase of the gravel packing operation. The operation mandated about a 4½-hour delay of the reversal process which would allow operations to POOH safely and efficiently. Of equal importance, was the ability of the selected breaker to reverse the residual filter cake to a water-wet state. In addition, the potential to dissolve any inherent carbonate greatly enhances the performance of the breaker system as well as its ability to disaggregate the residual filter-cake solids. Additional concerns for the breaker system included the following: a) minimize invasion and circumvent excessive fluid losses; and b) effective clean-up of the residual filter-cake. Laboratory tests were conducted to optimize the formulation of the delayed breaker fluid.

The testing involved the formulation of breaker systems that utilized the 11% KCl aqueous solution and a 15–40 wt % dipotassium EDTA aqueous solution (delayed phase changing agent solution or DPCA solution) as base fluids. The DPCA solution concentrations of 5% (v/v), 10% (v/v), 20% (v/v), and 30% (v/v), and 40% (v/v) were utilized. These solutions are designated as sample jars A through E (Table 1). These solutions were mass balanced to 8.9 ppg as this was the desired density for gravel packing. Next, a cationic surfactant was added and these sample jars are designated as F through J (Table 1). Finally, the breakers were "slicked" with a hydroxyethylcellose solution at 40 pptg. These samples jars are designated as K through O (Table 1). To maximize the number of tests that could be performed, breakers were formulated at a volume of 1/10 of a lab barrel (i.e., 35 mL). The pH for all the breakers was adjusted to approximately 5.0 using KOH. Finally a statically aged filter cake was added to each solution. The filter cakes were formed on the API filter paper using 500 psi differential to air at 155° F.

TABLE 1

Summary of Screening Tests

| | Formulation (all include KCl base solution) | Initial | After 30 minutes Dynamic | After 10 Hours Static |
|---|---|---|---|---|
| A | 5% DPCA solution | Cake intact | Cake intact | Cake intact |
| B | 10% DPCA solution | Cake intact | Slight Dispersed Cake | Partial Cake Dispersion |
| C | 20% DPCA solution | Cake intact | Partial Dispersed Cake | Complete Dispersion |
| D | 30% DPCA solution | Cake intact | Partial Dispersed Cake | Complete Dispersion |
| E | 40% DPCA solution | Cake intact | Partial Dispersed Cake | Complete Dispersion |

TABLE 1-continued

Summary of Screening Tests

| Formulation (all include KCl base solution) | Initial | After 30 minutes Dynamic | After 10 Hours Static |
|---|---|---|---|
| F  5% DPCA solution 0.15% Surfactant | Cake intact | Cake intact | Cake intact |
| G  10% DPCA solution 0.15% Surfactant | Cake intact | Cake intact | Partial Cake Dispersion |
| H  20% DPCA solution 0.15% Surfactant | Cake intact | Cake intact | Complete Dispersion |
| I  30% DPCA solution 0.15% Surfactant | Cake Intact Slight reaction | Partial Dispersed Cake | Complete Dispersion |
| J  40% DPCA solution 0.15% Surfactant | Cake Intact Slight reaction | Partial Dispersed Cake | Complete Dispersion |
| K  5% DPCA solution 0.15% Surfactant 40 pptg HEC | Cake intact | Cake intact | Cake intact Breaker Viscous |
| L  10% DPCA solution 0.15% Surfactant 40 pptg HEC | Cake intact | Cake intact | Slight Dispersed Cake Breaker Viscous |
| M  20% DPCA solution 0.15% Surfactant 40 pptg HEC | Cake intact | Cake intact | Partial Cake Dispersion Breaker Viscous |
| M  30% DPCA solution 0.15% Surfactant 40 pptg HEC | Cake intact | Cake intact | Partial Cake Dispersion Breaker Viscous |
| O  40% DPCA solution 0.15% Surfactant 40 pptg HEC | Cake intact | Cake intact | Partial Cake Dispersion Breaker Viscous |

In view of the above results one of skill in the art should appreciate that: a) a 30-minute "hot roll", simulating the beta phase, of residual filter cakes showed that the filter cakes remained intact when the breaker was "slicked" with 40 ppg hydroxylethylcellulose (HEC), further breakers that were not "slicked" exhibited relatively good dispersion of the filter cakes and b) 10-hour static aging, simulating isolation of the lateral, of residual FAZEPRO filter cakes and breakers showed that the filter cakes dispersed readily in the above formulated delayed breaker solution with concentrations of 20% and greater.

Based on the above testing a delayed breaker fluid was formulated an successfully used in the downhole operation:

| Component | Concentration |
|---|---|
| 11% Potassium Chloride solution | 8 ppg |
| DPCA solution | 30% (v/v) |
| Cationic Surfactant | 0.15% (v/v) |
| SAFE-VIS E (a hydroxyethyl cellose solution) | 0.5 gpb |

Upon review of the above disclosure, one of skill in the art should understand and appreciate that one illustrative embodiment of the disclosed subject matter includes a method of controlling the inversion of a drilling fluid in which the drilling fluid includes: an oleaginous fluid; a non-oleaginous fluid; an amine surfactant having the structure:

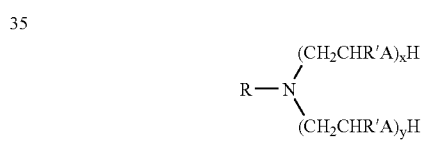

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$. The illustrative method includes mixing said drilling fluid with a delayed phase changing agent selected from aliphatic amine acids, salts of aliphatic amine acids and combinations thereof. In one preferred illustrative embodiment, the delayed phase changing agent is delivered in the form of a pill, the pill including a carrier fluid, a viscosifier and the delayed phase changing agent. The delayed phase changing agent may be selected from ethylene diamine tetraacetic acid, alkali metal salts of ethylene diamine tetraacetic acid and combinations of these and similar compounds. When a carrier fluid is utilized it is preferred that it be an aqueous alkali salt solution and more preferably a potassium chloride solution. Also in a preferred illustrative the viscosifier is a compatible viscosifier such as hydroxyethylcellose.

It should also be appreciated and understood that the present disclosure also encompasses a method of controlling the wettability of a filtercake. The filtercake is preferably formed while drilling a subterranean formation using a drilling fluid includes: an oleaginous fluid; a non-oleaginous fluid; an amine surfactant having the structure:

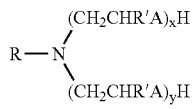

wherein R is a $C_{12}$–$C_{22}$ aliphatic hydrocarbon; R' is an independently selectable from hydrogen or $C_1$ to $C_3$ alkyl; A is NH or O, and $1 \leq x+y \leq 3$. In such an illustrative method, after formation of the filtercake, the filter cake is exposed to a delayed phase changing agent selected from the group consisting of aliphatic amine acids, salts of aliphatic amine acids and combinations thereof. In one preferred illustrative embodiment, the delayed phase changing agent is delivered in the form of a pill, the pill including a carrier fluid, a viscosifier and the delayed phase changing agent. The delayed phase changing agent may be selected from ethylene diamine tetraacetic acid, alkali metal salts of ethylene diamine tetraacetic acid and combinations of these and similar compounds. When a carrier fluid is utilized it is preferred that it be an aqueous alkali salt solution and more preferably a potassium chloride solution. Also in a preferred illustrative the viscosifier is a compatible viscosifier such as hydroxyethylcellose.

While the apparatus, compositions and methods disclosed above have been described in terms of preferred or illustrative embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the claimed subject matter as it is set out in the following claims.

What is claimed is:

1. A method of controlling the inversion of a drilling fluid, wherein the drilling fluid includes: an oleaginous fluid; a non-oleaginous fluid; an amine surfactant having the structure

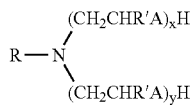

wherein R is a $C_{12}$–$C_{22}$ aliphatic hydrocarbon; R' is independently selectable from hydrogen or $C_1$ to $C_3$ alkyl; A is NH or O, and $1 \leq x+y \leq 3$, the method comprising:

mixing said drilling fluid with a delayed phase changing agent selected from the group consisting of aliphatic amine acids, salts of aliphatic amine acids and combinations thereof, wherein the delayed phase changing agent is delivered in the form of a pill, the pill comprising a carrier fluid, a viscosifier and the delayed phase changing agent, and wherein the pill is in the form of a slug of fluid that remains generally uniform within the well bore.

2. The method of claim 1, wherein the delayed phase changing agent is selected from the group consisting of ethylene diamine tetraacetic acid, alkali metal salts of ethylene diamine tetraacetic acid and combinations thereof.

3. The method of claim 1, wherein the carrier fluid is an aqueous alkali salt solution.

4. The method of claim 1, wherein the viscosifier is a hydroxyethylcellulose.

5. A method of controlling the wettability of a filtercake, wherein the filtercake is formed while drilling a subterranean formation using a drilling fluid that includes: an oleaginous fluid; a non-oleaginous fluid; an amine surfactant having the structure

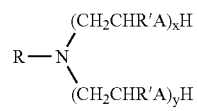

wherein R is a $C_{12}$–$C_{22}$ aliphatic hydrocarbon; R' is independently selectable from hydrogen or $C_1$ to $C_3$ alkyl; A is NH or O, and $1 \leq x+y \leq 3$, the method comprising:

exposing said filtercake to a delayed phase changing agent selected from the group consisting of aliphatic amine acids, salts of aliphatic amine acids and combinations thereof, wherein the delayed phase changing agent is delivered in the form of a pill, the pill comprising a carrier fluid, a viscosifier and the delayed phase changing agent, and wherein the pill is in the form of a slug of fluid that remains generally uniform within the well bore.

6. The method of claim 5, wherein the delayed phase changing agent is selected from the group consisting of ethylene diamine tetraacetic acid, alkali metal salts of ethylene diamine tetraacetic acid and combinations thereof.

7. The method of claim 5 wherein the carrier fluid is an aqueous alkali salt solution.

8. The method of claim 5, wherein the viscosifier is a hydroxyethylcellulose.

* * * * *